June 3, 1924.

L. GREENWALD

TIRE VALVE

Filed April 25, 1921

1,496,761

INVENTOR.
Lemon Greenwald
BY
ATTORNEY.

Patented June 3, 1924.

1,496,761

UNITED STATES PATENT OFFICE.

LEMON GREENWALD, OF AKRON, OHIO, ASSIGNOR TO THE FIRESTONE TIRE AND RUBBER COMPANY, OF AKRON, OHIO, A CORPORATION OF OHIO.

TIRE VALVE.

Application filed April 25, 1921. Serial No. 464,191.

*To all whom it may concern:*

Be it known that I, LEMON GREENWALD, a citizen of the United States, residing at Akron, county of Summit, and State of Ohio, have invented certain new and useful Improvements in Tire Valves, of which the following is a specification.

This invention relates to valve constructions and while it may be of general application it is specifically designed to improve upon the construction of valves for use with pneumatic tire tubes. The particular object of my invention is to improve upon the construction of the removable part or valve insides shown in my prior Patent No. 1,255,411, dated Feb. 11th, 1918.

An object of my invention is to improve upon the means for sealing the passageway between the valve insides and the valve stem and it is the purpose of my invention to design a simple and effective means for forming an air tight seal at this point which will give satisfactory service under all conditions and which will not be injurious to the life of the gasket.

My invention may be embodied in many different forms but that shown in the accompanying drawings is the preferred form in which—

Figure 1:
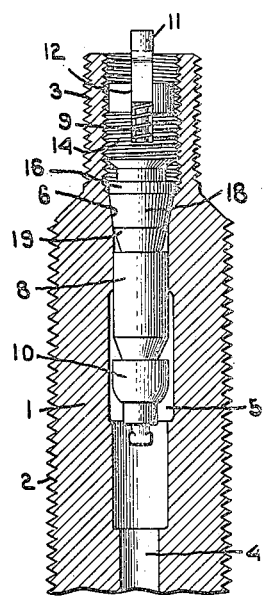
Fig. 1 is a longitudinal section through a valve stem provided with my improved form of valve mechanism.
Figure 2:
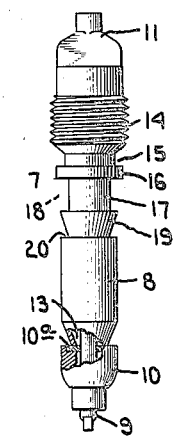
Fig. 2 is an enlarged view of the valve barrel with the upper gasket removed, a portion of the valve being broken away to show the construction.

The construction of valve insides designed by me, is suitable for application in any desirable form of valve stem, but I have preferred to show it positioned in the ordinary or standard valve stem which is indicated generally by the numeral 1. The main body of the valve stem is provided with a screw threaded outer surface 2, designed to hold the dust cap and with a reduced threaded outer end 3 which is designed to hold the ordinary valve cap. Interiorly of the tube there is arranged a bore or passageway for the air which, as shown, is of varying dimensions, the lower portion comprising a straight passageway 4 which connects the tube and the enlarged chamber 5 in which the valve opens. Above the chamber 5 the passageway is provided with a tapering or conical seat 6 at which point the passageway between the valve mechanism and valve stem is sealed. Above the tapered portion 6 is arranged an enlarged screw threaded bore, into which the valve insides is screwed.

The valve insides or valve mechanism is indicated by the numeral 7 and is formed of a one piece or unitary barrel 8, a valve post 9 and a valve 10. The barrel is hollowed out in accordance with the showing in my prior patent and within the barrel is seated a light coil spring which maintains the valve closed under normal conditions. The upper end of the valve post is provided with a flattened head 11, which is received within a slot 12 in the barrel, so that the barrel can be screwed into and out of the valve stem by rotation imparted through the valve post.

The post carries the valve proper 10 at its lower end, the upper surface of the valve proper carrying a small gasket $10^a$ which bears against the aperture 13 in the lower end of the barrel. The upper end of the barrel is screw threaded for a short distance as at 14, in order to enable it to be received in the upper end of the valve stem. Below the screw threads 14 the valve barrel is cut away or recessed as at 15 and below the recess the barrel is slightly enlarged to provide a collar or flange 16. This collar or flange is formed of dimensions so that when the valve part is screwed into the valve stem, the flange will bear against and make a tight metallic seat against the tapered portion of the valve stem. If desired, the valve barrel may be made of metal slightly softer than the valve stem, so that a positive mechanical seat may be provided, but this is not essential to my invention as any suitable metallic surface will serve the purpose.

Below the flange 16 the barrel is cut away to furnish a recess 17 in which is received a rubber gasket 18. This rubber gasket is preferably of an outer diameter equal to the flange 16 so as to be flush with its outer surface, although it may be slightly less than the diameter of the flange, the purpose of the gasket being to provide a seal additional to or supplementing the metallic seal between the valve barrel and the valve stem. The gasket may be omitted if desired. Below the recess 17 the valve barrel is provided with a tapered or sharp edged flange 19 which is preferably of a diameter sufficient to fit closely in the tapered surface of the valve seat. The ledge 20, below the flange 19 is provided to catch any particles of the gasket which may be received between the edge 19 and the tapering surface of the valve stem.

In constructions prior to my invention it has been usual to provide a sealing contact by compression of the rubber gasket against the side of the valve stem. I have found that this means of sealing the inside of the valve is attended with many disadvantages. The gasket is often squeezed out between the barrel and the stem, and as the insides are screwed in tightly, the gasket may be torn and if screwed in and out several times, is often completely destroyed, rendering the insides worthless. The rubber comprising the gasket ages rapidly so that there is no assurance that there will be a tight sealing of the valve insides at this point, beyond a limited time in which the rubber gasket will deteriorate with age. The metallic seal which I use for obtaining an air tight connection between the valve insides and the valve stem, makes an air tight seal at all times, due to the fact that the removable barrel is rotated in being forced into position, which forces the two metallic surfaces together until a perfect seal is obtained. By providing the upper flange 16 of the proper diameter to make a substantial metallic seal with the tapered seat and by supplementing said metallic seal with a rubber gasket, I have provided a perfect seal at this point.

It is not my intention to rely to any great extent upon the compression of the rubber gasket. The function of the rubber gasket is simply to fill the space or slight crack which may occur around the metallic seal, thus making the metallic seal the principal means for obtaining the air tight connection and supplementing this action by the rubber gasket. The rubber gasket is not forced against and does not squeeze out between the flange and the barrel and is therefore not subject to the tearing action which takes place where a considerable space is allowed between the barrel and the insides. Any excess rubber which may be found in the gasket will be forced over the lower flange and the sharp edge will cut off such fragments as project over the lower flange. Any fin or film of rubber which may be found on the outer surface of the flange 16 will be cut away from the main part of the gasket by the sharp edge contact between the lower edge of the flange 16 and the tapered seat. The recess 20 below the flange 19 serves to catch or trap any particles of the gasket which might be cut away and prevents them from falling on the valve proper which might disturb the sealing action at this point.

By constructing the air tight seal in the manner described, I am enabled to form a perfect seal without danger of destroying the gasket and without adopting a swivel connection between the part which screws in the stem and the gasket carrying member, an expedient resorted to in the ordinary form of valve so that the gasket will not rotate in being forced into its position. This remedy which has been adopted in valves now in universal use and the swivel connection increases the cost of manufacture of the valve insides. In addition to the advantages outlined the rotative seating of the flange 16 on the inner surface of the valve stem is a decided improvement over the prior art, as it makes a metallic seal practicable by the grinding or rubbing action of the metal parts in finding their position. It will be understood that in the construction of the valve and the dimensions and preparation of the parts, I am dealing with microscopic dimensions and the principle of sealing the valve is entirely different and the arrangement of the parts accomplishes new and useful results.

I do not consider myself confined to exact dimensions or to the precise details or arrangements of parts shown in the drawings. I believe I am the first to combine in a removable valve part, the rotative metallic seal with or without the rubber gasket, to accomplished the useful function which I have described, and I am the first to provide an air tight connection in which the gasket if used, cannot be subjected to abuse or be destroyed, and which will maintain a perfect seal for an indefinite period, and which can be removed and replaced in the stem a great number of times without injury to the gasket. I am therefore entitled to a broad range of equivalents in the construction of the appended claim.

I claim:

In a tire valve construction, a valve stem, a barrel carrying a valve mechanism, adapted to be screwed in and out of the valve stem, a flange on the barrel having a sharp outer edge, a tapered seat on the valve stem, a packing on the barrel above the flange, the flange contacting the seat upon screwing in of the barrel, and a trap below the flange to catch particles of the packing cut off by the flange.

LEMON GREENWALD.